United States Patent
His et al.

(10) Patent No.: US 8,043,694 B2
(45) Date of Patent: Oct. 25, 2011

(54) IMPREGNATED CERAMIC FOAM MADE OF RECRYSTALLIZED SILICON CARBIDE

(75) Inventors: Christian Claude His, Cavaillon (FR); Franceline Villermaux, Avignon (FR); Nicolas Raffin, Le Thor (FR); Michel Dussaulx, Roedental (DE)

(73) Assignee: Saint Gobain Centre de Recherches et d'Etudes Europeen, Courbevoie (FR)

( * ) Notice: Subject to any disclaimer, the term of this patent is extended or adjusted under 35 U.S.C. 154(b) by 478 days.

(21) Appl. No.: 12/162,766

(22) PCT Filed: Jan. 30, 2007

(86) PCT No.: PCT/FR2007/050709
§ 371 (c)(1),
(2), (4) Date: Oct. 28, 2008

(87) PCT Pub. No.: WO2007/088306
PCT Pub. Date: Aug. 9, 2007

(65) Prior Publication Data
US 2009/0305017 A1    Dec. 10, 2009

(30) Foreign Application Priority Data
Feb. 1, 2006    (FR) .................................. 06 00942

(51) Int. Cl.
*B32B 3/26*    (2006.01)
*B29C 44/12*   (2006.01)

(52) U.S. Cl. ............... 428/307.7; 428/312.2; 428/316.6; 428/319.7; 428/426; 427/244; 427/246; 264/42; 264/45.3; 264/46.4

(58) Field of Classification Search ................. None
See application file for complete search history.

(56) References Cited

U.S. PATENT DOCUMENTS

| 4,024,212 A | 5/1977 | Dore et al. |
| 5,643,512 A | 7/1997 | Daws et al. |
| 5,705,448 A | 1/1998 | Sambrook et al. |

FOREIGN PATENT DOCUMENTS

| DE | 100 13 378 A1 | 10/2001 |
| EP | 0 330 963 A2 | 9/1989 |
| EP | 0 759 020 B1 | 3/1999 |
| EP | 1 140 731 B1 | 2/2003 |
| EP | 1 329 439 A1 | 7/2003 |
| FR | 2873687 * | 2/2006 |
| WO | 95/30633 | 11/1995 |
| WO | 00/29353 | 5/2000 |
| WO | WO 2007/088306 A1 | 8/2007 |

* cited by examiner

*Primary Examiner* — Ling Xu
(74) *Attorney, Agent, or Firm* — Young & Thompson

(57) ABSTRACT

Porous ceramic part comprising a porous ceramic foam having a total porosity of between 50 and 92% and an intergranular porosity of at least 5%, walls of at least some of the cells of the ceramic foam being at least partly covered with an impregnation material. The invention relates in particular to a recrystallized silicon carbide foam impregnated with silicon.

27 Claims, 5 Drawing Sheets

1 mm

200 μm

100 μm

50 μm

200 μm

50 μm

100 μm

IMPREGNATED CERAMIC FOAM MADE OF RECRYSTALLIZED SILICON CARBIDE

The invention refers to a porous ceramic part comprising an impregnated porous ceramic foam, to a method of obtaining such a part, and to uses of such a part.

The porous ceramic foams are known porous products characterized by a low density (5 to 50% of the theoretical density). They can be made from the large majority of ceramic powders, particularly alumina, silicon carbide, zirconia, etc.

There are several methods of manufacture, which make it possible to obtain porous ceramic foams.

The simplest of these methods includes the addition of a pore-forming agent in a ceramic slip or a mixture to be pressed. The whole unit is shaped, then undergoes a curing cycle which burns the pore-forming agent. While burning, the pore-forming agent gives scope for a porosity. This method is described for example in patent EP 1,140,731 B1. It presents the disadvantage of leading to an off-gas (possibly toxic) due to the pyrolysis of the pore-forming agent. In addition, it is difficult to manufacture thick parts because the off-gas is therefore difficult to accomplish (the gas must be able to be evacuated in a homogeneous way).

Another technique is the replication of a polymer foam, polyurethane for example. This foam is covered with a ceramic slip. The whole unit then undergoes a curing cycle which burns the polyurethane foam and sinters the ceramic foam, of which the structure is induced by the initial polyurethane foam. This method is described for example in the U.S. Pat. No. 4,024,212. One finds the disadvantages related to the off-gas (while burning, the polyurethane releases C—N bonded gases which are dangerous). In addition, it is difficult to produce parts with pores having dimensions less than 200 µm.

An alternative technique is the creation of porosities by the formation of gas by chemical reaction between various additives of a ceramic slip. This method is described for example in U.S. Pat. No. 5,643,512 or U.S. Pat. No. 5,705,448. There again, one finds the disadvantages related to the off-gas. Moreover, it is necessary to associate a foam consolidation technique to this method.

A technique consists in mechanically introducing a gas into a slip by stirring. There again, this method must be combined with a foam consolidation technique, obtained so as to avoid the coalescence of the bubbles or the drainage of the liquid phase.

Among the foam consolidation techniques which can be used for the implementation of the last two above-mentioned techniques, there are also several possibilities.

A first solution consists in mixing polymerizable monomers with the ceramic slip. Under particular conditions, the polymerization of the monomers leads to the consolidation of the foam. This method is described for example in patent EP 759,020 B1. On the other hand, the high cost of the usable monomers, as well as the difficulty in controlling the polymerization conditions, prevented this technique from developing industrially.

A second solution consists in cross-linking polymers in a ceramic slip. As with the preceding technique, this cross-linking leads to the consolidation of the foam. This method is described for example in patent EP 330,963. On the other hand, the high cost of the usable cross-linking agents, as well as the difficulty in controlling the cross-linking conditions, prevented this technique from developing industrially.

A more recent method for manufacturing porous ceramics is described in the patent application EP 1,329,439 A1. This method comprises the following steps:

1) Preparation of a suspension of a ceramic powder in a dispersant,
2) Preparation of a solution containing a biogel, called "hydrocolloid", and maintained at a temperature higher than the gelling temperature of the solution,
3) Mixing of said suspension and said solution, with the addition of a foaming agent, until a foam is obtained, the temperature being maintained sufficiently high to avoid the gelling of the biogel,
4) Casting of the foam in a mould,
5) Cooling until gelling of the biogel,
6) Drying, calcination and sintering of the foam obtained.

The use of a biogel to consolidate the foam makes it possible to avoid the previously described toxicity problems. However, it turns out that if the foam casted in the mould has a thickness greater than 60 mm, the foam does not have a homogeneous structure. Moreover, according to this method, the quantity of water in the final mixture is great (45 to 50% in weight), which leads to difficulties in drying, particularly for the large parts. Therefore, it is not possible to manufacture porous ceramic parts of homogeneous structure with such dimensions.

The French patent application filed by the Saint-Gobain Company, European Centre for Research and Studies, under the number FR 0408330, describes an improved method for manufacturing porous ceramic foam parts, of homogeneous density, having dimensions higher than or equal to 60 mm.

For this purpose, FR 0408330 offers a method of manufacturing a porous ceramic part including the following successive steps:

a) preparation of a mixture M containing a suspended ceramic powder, at least one gelling agent and at least one foaming agent, at a mixing temperature higher than the gelling temperature of said gelling agent,
b) shearing of said mixture M at a foaming temperature higher than said gelling temperature, until a foam is obtained,
c) gelling of said foam by cooling said mixture M at a temperature lower than the gelling temperature of said gelling agent,
d) drying of said gelled foam such as to obtain a preform,
e) sintering of said preform such as to obtain a sintered ceramic foam.

According to this method, a stabilizing agent is added to said mixture M, whose instantaneous viscosity, in Pa·s, increases by at least a factor ten when a shearing speed of said stabilizing agent falls from $100\ s^{-1}$ to $0\ s^{-1}$.

The inventors of the invention described in FR 0408330 observed that the collapse of foam when the method according to EP 1,329,439 A1 is implemented occurs during a critical period between the end of the shearing step and the beginning of gelling. During this period, the gelling agent does not substantially contribute to the structural stabilization of the foam, which, for thicknesses greater than 60 mm, breaks down under its own weight. Once the cause of the collapse was identified by the above-mentioned inventors, they suggested adding a stabilizing agent to the mixture. The stabilizing agent is selected for its capacity to considerably increase the viscosity of the mixture as soon as the shearing of the mixture ceases, which makes the foam sufficiently rigid to avoid it collapsing until the gelling agent gels and can exert its stabilizing function. Thus, it becomes possible to manufacture porous ceramic foam parts, of homogeneous density, with dimensions higher than or equal to 60 mm.

The choice of the ceramic powders used in the various methods described above generally depends upon the constraints to which foams in service are subjected, particularly mechanical strength or thermal conductivity constraints.

In certain applications, for use as a catalyst support for example, one also looks for the highest possible available surfaces.

The French patent application filed by the Saint-Gobain Company, European Centre for Research and Studies, under the number FR 0507936 describes an improved method for manufacturing a cured ceramic foam with porous walls, having a total porosity of between 50 and 92% (i.e. a density between 8 and 50% of the theoretical density of the material which makes up said foam) and an intergranular porosity of at least 5%, preferably of at least 8%, preferably still of at least 10%.

Unlike the ceramic foams known before the filing of FR 0507936, of which the cellular walls are dense, the ceramic foam described in FR 0507936 thus has an intergranular porosity. This intergranular porosity considerably develops the available surface on the cell walls of the foam.

Preferably, the cured ceramic foam with porous walls described in FR 0507936, or "with intergranular porosity", further has one or more of the following characteristics:

The size of the intergranular pores is on average 10 to 100 times smaller than that of the cellular pores.

Preferably, at least a part of the cells, preferably all the cells, are delimited by recrystallized silicon carbide walls, at least partly, preferably completely. Preferably still, the porous ceramic foam with intergranular porosity comprises at least 95% in mass of recrystallized silicon carbide. Preferably, the porous ceramic foam with intergranular porosity comprises more than 98% in mass, preferably still substantially 100% of recrystallized silicon carbide.

The porous ceramic foam has a thickness greater than 60 mm.

FR 0507936 further describes a method for manufacturing a porous ceramic foam with intergranular porosity. This method includes the following successive steps:

a) preparation of a mixture M containing a suspended ceramic powder, at least one gelling agent and at least one foaming agent, at a mixing temperature higher than the gelling temperature of said gelling agent, the mixture M comprising silicon carbide, b) shearing of said mixture M at a foaming temperature higher than said gelling temperature, until a foam is obtained, c) gelling of said foam by cooling said mixture M at a temperature lower than the gelling temperature of said gelling agent, d) drying of said gelled foam such as to obtain a preform, e) curing of said preform such as to obtain a porous ceramic foam under conditions allowing a consolidation by means of an evaporation-recrystallization mechanism of said silicon carbide.

Hereinafter, this curing is known as "high temperature curing" or "recrystallization step". This curing leads to the formation of recrystallized silicon carbide.

Preferably, this method still presents one or more of the following characteristics:

Preferably, the ceramic powder used in step a) has more than 95% in weight of silicon carbide.

The particle sizes of the ceramic powder implemented in step a) are distributed bimodally. For example, a powder made from two sources of silicon carbide, having different median diameters, can be used.

Preferably, the curing temperature by high temperature treatment and all organic components used are determined so that all said organic components are burned during curing.

Preferably, a stabilizing agent is added to said mixture M, whose instantaneous viscosity, in Pa·s, increases by at least a factor ten when a shearing speed of said stabilizing agent falls from $100\ s^{-1}$ to $0\ s^{-1}$.

The instantaneous viscosity of said stabilizing agent, in Pa·s, increases by at least a factor hundred when a shearing speed of said stabilizing agent falls from $100\ s^{-1}$ to $0\ s^{-1}$. Advantageously, the effect on the stabilization of the foam is reinforced, which makes it possible to manufacture porous parts with thicknesses greater than 90 mm.

The evolution of the viscosity of said stabilizing agent according to the shearing speed of said stabilizing agent is substantially reversible. Thus, as soon as the shearing speed of the mixture M increases, the influence of the stabilizing agent on the viscosity of the mixture decreases, and can even become negligible. Advantageously, the presence of the stabilizing agent does not therefore lead to a great increase in the energy requirement.

At step a), said mixture M is prepared from a ceramic slip A, from a premixture B containing at least one gelling agent and a stabilizing agent, and from a premixture C containing at least one foaming agent.

Said stabilizing agent is selected so that, at the end of step c), the viscosity of said foam is greater than 1000 Pa·s at 20° C. Preferably, said stabilizing agent is a hydrocolloid, preferably of vegetable origin, preferably still selected from the group formed by xanthan and carrageenan, or a mixture thereof. The preferred stabilizing agent is xanthan. Advantageously, the hydrocolloids of vegetable origin are removed at the curing step by high temperature treatment of the preform, which makes it possible to obtain a cured part with great purity.

The content of said stabilizing agent in said mixture M is between 0.05 and 5% in weight, preferably between 0.1 and 1% in weight.

Said mixture M has a water content of less than 40%, preferably less than 30%, expressed as a weight percentage.

Said gelling agent is a hydrocolloid of animal or vegetable origin, adapted to gel said composition after foaming in a thermo-reversible way. Preferably, said gelling agent is gelatine. Advantageously, the gelling agent is removed during the curing step by high temperature treatment of the preform, which makes it possible to obtain a cured foam with great purity. Preferably still, the content of gelling agent in the mixture M is between 1 and 10%, preferably between 1 and 6% in weight.

At step a), a plasticizing agent is preferably added to said mixture M in a quantity in weight between 0.25 and 1 times that of said gelling agent. Preferably still, the plasticizing agent is selected to burn at a temperature higher than the evaporation temperature of the liquid used at step a), to suspend the ceramic powder, generally water.

The invention described in FR 0507936, incorporated by reference, therefore provides a cured porous ceramic foam which has, because of the specific structure of the walls which delimit the cells, a surface exposed to the considerable external environment. This new microstructure of cellular walls thus gives very broad development prospects.

However, in certain applications this foam has the disadvantage of a mechanical strength which is too limited.

Thus, there is a need for a porous ceramic foam of the type described in FR 0507936, with an improved mechanical strength.

The object of the present invention is to satisfy this need.

According to the invention, one reaches this object by means of a porous ceramic part comprising a porous ceramic foam having a total porosity of between 50 and 92% and an intergranular porosity of at least 5%, walls of at least some of the cells of said ceramic foam being at least partly impregnated with an impregnation material.

As will be seen in more detail hereinafter, the impregnation material benefits from a raised binding surface because of the presence of the initial intergranular porosity of the foam. The cohesion of the part according to the invention is thus improved.

"Impregnation material" means a material which sticks to the grains of the ceramic part so as to join them together. In a preferred embodiment of the invention, the impregnation material penetrates into the core of said walls and blocks, at least partially, preferably completely, the intergranular pores of said walls, thus constituting a binding matrix between said grains.

Advantageously, the intergranular porosity allows the impregnation material to penetrate the thickness of the cell walls. It can therefore considerably reinforce the mechanical strength of the ceramic foam without substantially modifying the cellular porosity of the foam.

The impregnation material blocking at least partly the intergranular pores, the part according to the invention is thus particularly advantageous in applications where the intergranular porosity is not essential, but where one seeks to preserve a certain level of cellular porosity.

Preferably, the foam implemented has one or more of the preferred foam characteristics described in FR 0507936 and particularly those recalled above, or is manufactured according to a method described in FR 0507936, and for example has one or more of the preferred characteristics recalled above.

Preferably still, the ceramic part according to the invention further has one or more of the following characteristics:

At least the walls of the surface cells of the ceramic foam, i.e. exposed to the external environment of the foam, are impregnated, at least partly, with impregnation material. Preferably, the walls of all the cells of the ceramic foam are impregnated, at least partly, with impregnation material.

The impregnation material is selected from a metal, preferably silicon or aluminium, a metal alloy, a molten glass, preferably a soda-lime glass or a boron glass, or a thermoplastic organic compound, preferably of resin type.

The impregnation material does not block the interconnection windows between the cells of the foam. Preferably, it does not block the openings to the outside of the surface cells.

The impregnated foam has a total porosity greater than 50%, preferably greater than 70% and/or less than 92%.

The impregnation material does not fill the interconnection windows between cells, and thus a fortiori, does not fill the cells of the foam.

The porous ceramic foam comprises at least 95% in mass of recrystallized silicon carbide. The "porous ceramic foam" must be distinguished from the "porous ceramic part" according to the invention, which includes the porous ceramic foam and the impregnation material.

Before impregnation, the porous ceramic foam has an intergranular porosity of at least 8%, preferably of at least 10% and/or the average size of the intergranular pores of the foam is greater than 8 µm, preferably greater than 10 µm and/or less than 20 µm, preferably less than 15 µm. Preferably, the average size of the cellular pores of the foam is between 150 and 700 µm and, preferably still of approximately 350 µm.

The porous ceramic part has a flexural Modulus of Rupture greater than 2 MPa, preferably greater than 3.5 MPa, and a total porosity greater than 70%, preferably of approximately 75%.

The volume of the impregnation material in the ceramic part is substantially equal to the volume of the intergranular pores of the foam before impregnation.

The invention further relates to a method of manufacturing a porous ceramic part comprising an impregnation, by means of an impregnation material, of at least a part of the walls of the cells of a ceramic foam having a total porosity of between 50 and 92%, and an intergranular porosity of at least 5%.

Preferably, the impregnation material and the ceramic foam are selected so that the obtained porous ceramic part is according to the invention.

In a first alternative of the method according to the invention, hereinafter known as "way 1", the impregnation is carried out on the porous ceramic foam, i.e. after the curing step. The impregnation material is put into contact, in the form of a powder, with the foam, and the whole unit is heated until the impregnation material is fused. The impregnation material in liquid form thus penetrates within the walls, and therefore "impregnates" these walls.

Preferably, the contact of the impregnation material in powder form and the preform results from the application of this powder on the upper and lower surfaces of the preform. It is also possible "to soak", at least partially, the foam in the impregnation material in powder form or to spray said impregnation material on the foam.

After impregnation, the impregnation material hardens, because of its cooling for example, or is hardened by a suitable treatment. A porous ceramic part according to the invention is therefore obtained.

Preferably, the impregnation material and the ceramic foam are selected so as to obtain a porous ceramic part according to the invention.

Preferably still, the liquid impregnation material penetrates within the walls by capillarity.

In the case of foams manufactured according to the method described in FR 0507936, the mechanical strength is less than 15 MPa, which makes any impregnation by casting under pressure impossible. A penetration of the impregnation material by capillarity is therefore particularly advantageous.

In the case of a porous ceramic foam containing recrystallized silicon carbide, the method for manufacturing the porous ceramic foam having a total porosity of between 50 and 92% and an intergranular porosity of at least 5%, is preferably according to the method described in FR 0507936 and comprises one, and preferably several of the preferred characteristics of this method recalled above.

Moreover, preferably, the mixture M prepared at step a) comprises a quantity of water greater than 15%, preferably greater than 20% and/or less than 50%, preferably less than 40%, in mass percentage in relation to the weight of the mixture.

Preferably, the mixture M does not comprise a thermohardener.

Moreover, preferably, silica is then added to the mixture M, preferably in a quantity greater than or equal to 2% in weight with relation to the mixture M. Advantageously, the silica favours the recrystallization. In a preferred way, the particle sizes of the ceramic powder implemented to prepare the mixture M are distributed bimodally or, preferably still, trimodally.

The inventors also developed a new method, hereinafter known as "way 2", allowing ceramic parts according to the invention to be manufactured. This method has several alternatives, called "way 2a" and "way 2b", described in more detail below.

The new method for manufacturing includes steps a) to e) of the method of FR 0507936 described above.

At step d), drying can be carried out at ambient temperature and/or in an oven at a temperature between 20 and 120° C.

According to way 2a, this method is remarkable in that, after step d), an impregnation material in the form of powder is put into contact with said preform.

According to way 2b, this method is remarkable in that, at step a), an impregnation material in the form of powder is added to the mixture M.

Advantageously, the method according to way 2 is faster than the previous one, impregnation and recrystallization being simultaneous.

Preferably, according to way 2a, before step d), the impregnation material, preferably metal silicon in powder form, is put into contact with said preform, preferably, in contact with the upper and lower surfaces of said preform. During the thermal treatment in step e), an impregnation of the intergranular pores by the molten impregnation material, and a recrystallization of the silicon carbide occur simultaneously.

According to way 2b, silicon powder is preferably introduced in the mixture M, at step a). Preferably, a grade between 0.05 mm and 2 mm is used, preferably between 0.2 mm and 2 mm.

Preferably still, carbon is also added to the mixture M, at step a). For the carbon, black carbon (<1 micron) or graphite (grains size between 5 and 15 microns) is preferably used.

Besides the differences above, this method for manufacturing is preferably according to the method described in FR 0507936, and comprises one and preferably several of the preferred characteristics of this method recalled above.

Finally, the invention relates to the use of a porous ceramic part according to the invention or of a porous ceramic part manufactured by means of a method according to the invention, for catalysis supports, liquid or hot gas filtration, as a diffuser (heated part letting the air/gas mixture necessary for the combustion pass through) in a gas-burner, in a solar volumetric receiver, or as a saggar stack part (curing supports).

BRIEF DESCRIPTION OF THE DRAWINGS

Other characteristics and advantages of the present invention will appear with the reading of the description hereinafter, and with the examination of the attached drawing wherein.

Figure 1A:
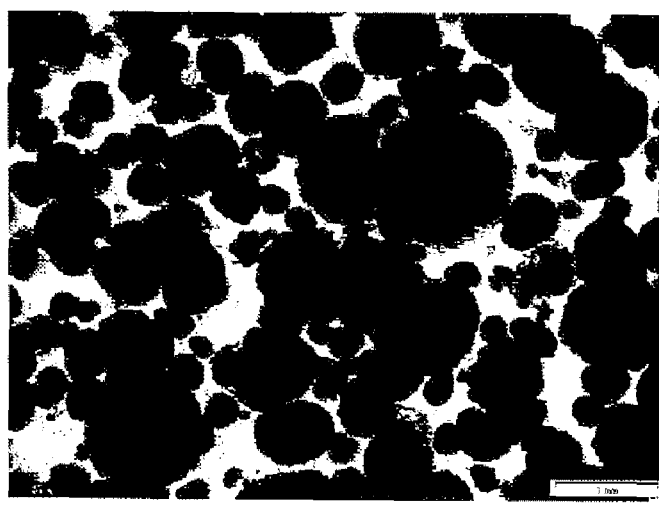
FIGS. 1 (1a to 1e) show, with various enlargements, images obtained with an optical microscope, on samples taken at 10 to 20 mm from the surface of parts according to the invention, manufactured according to way 1, the impregnation material being silicon.
Figure 1B:
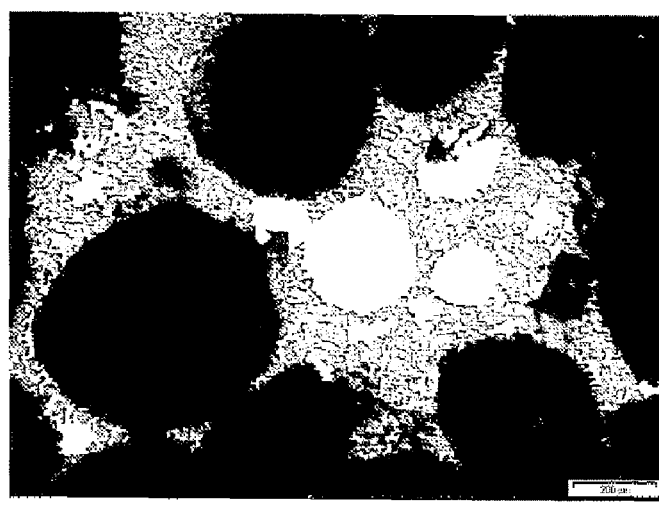
Figure 1C:
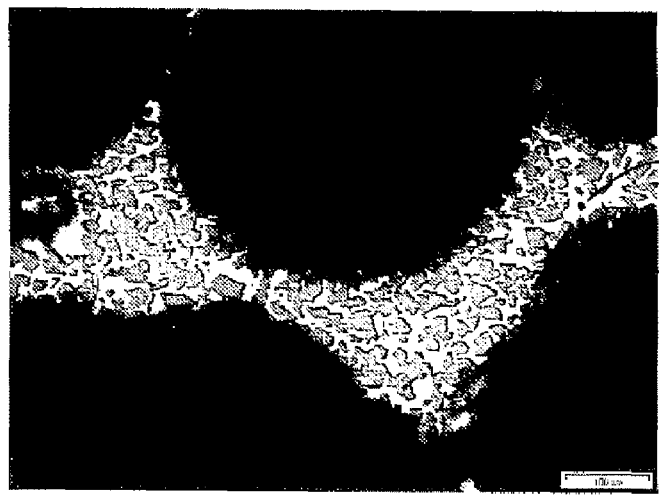
Figure 1D:
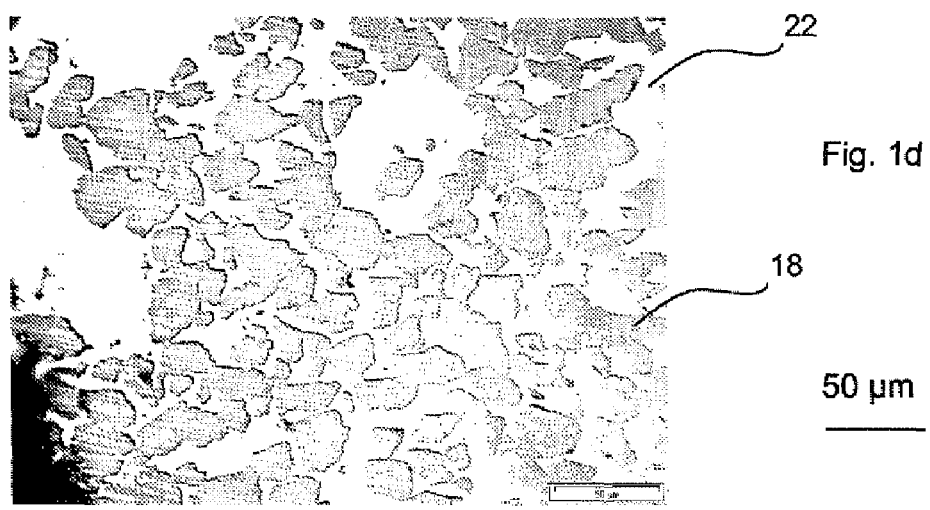
Figure 1E:
Figure 2A:
FIGS. 2a and 2b show, with various enlargements, images obtained with an optical microscope, on samples taken at 10 to 20 mm from the surface of parts according to the invention, manufactured according to way 1, the impregnation material being glass.
Figure 2B:
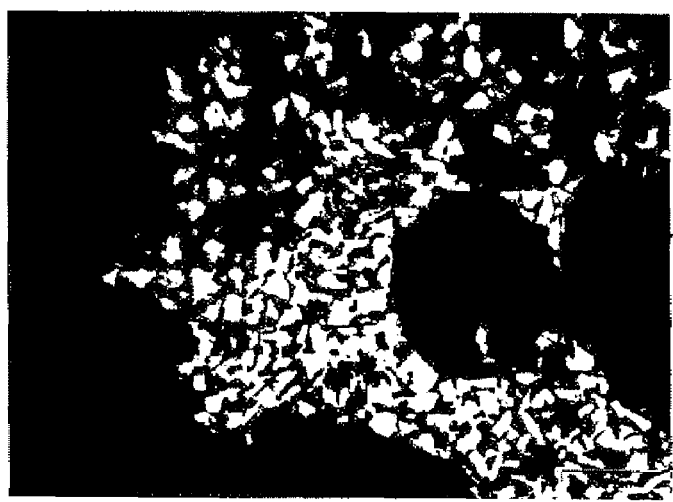
Figure 3:
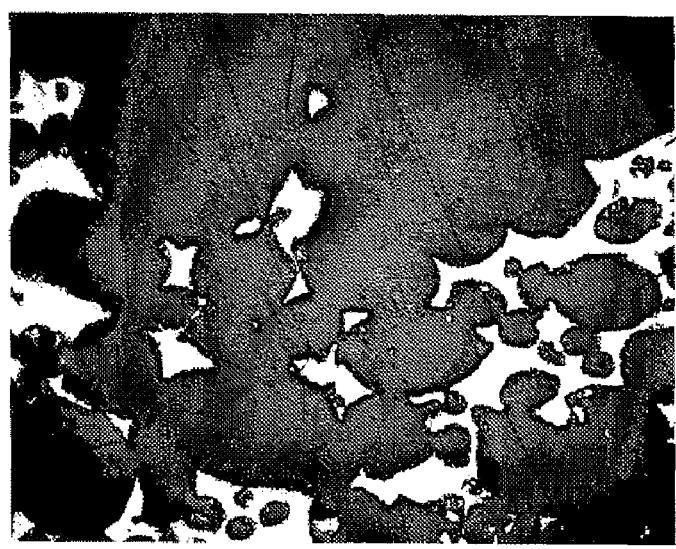
FIGS. 3 and 4 show, with various enlargements, images obtained with an optical microscope, on samples taken at 10 to 20 mm from the surface of parts according to the invention, manufactured according to way 2a, the impregnation material being silicon.
Figure 4:
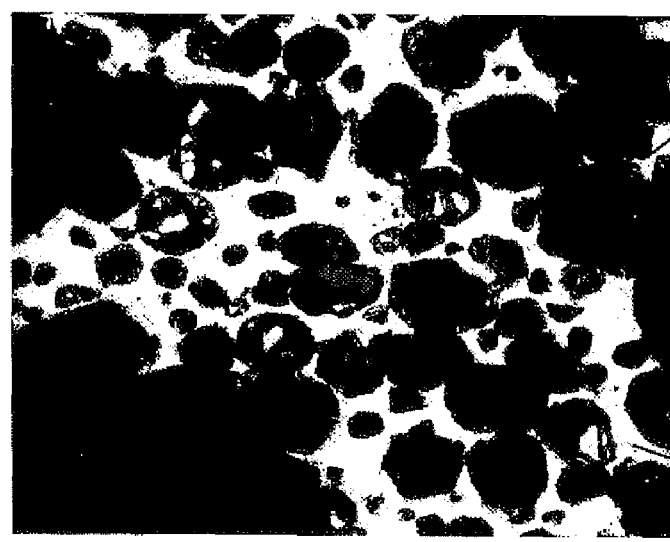

In the various figures, identical references are used to designate identical or similar objects.

Recrystallization is a well-known phenomenon, corresponding to a consolidation by means of evaporation of the smallest silicon carbide grains, then condensation to form the bonds between the larger grains.

"Recrystallized silicon carbide" means silicon carbide recrystallized during the curing step by high temperature treatment of the ceramic foam.

"Size of a pore" means its maximum dimension. In the products of the invention, the pores have a quasi-spherical shape and in this case the size is the diameter. The size of the pores is measured by analyzing images of the surface of the cured foams.

One now describes a method which can be implemented to manufacture the ceramic foams represented on FIGS. 1 to 4 and 7 to 9.

This method comprises the following successive steps:
a) preparation of a mixture M containing a suspended ceramic powder, at least one gelling agent and at least one foaming agent, at a mixing temperature higher than the gelling temperature of said gelling agent,
b) shearing of said mixture M at a foaming temperature higher than said gelling temperature, until a foam is obtained,
c) gelling of said foam by cooling said mixture M at a temperature lower than the gelling temperature of said gelling agent,
d) drying of said gelled foam such as to obtain a preform,
e) curing by high temperature treatment of said preform so as to obtain a porous ceramic foam.

In the first step a) of this method of manufacture, a mixture is prepared, containing a suspended ceramic powder, preferably in water, at least one gelling agent and at least one foaming agent.

Moreover, a stabilizing agent is preferably added to said mixture.

Preferably, one proceeds in the following way.

One firstly prepares,
  a slip A by dispersion of the ceramic powder and a dispersant in water, according to a traditional technique,
  a premixture B by dissolution of the gelling and stabilizing agents in water, at a temperature higher than the gelling temperature of the gelling agent,
  a premixture C by solubilisation of a foaming agent in water.

The quantity of ceramic powder in slip A is preferably between 50 and 90% in weight, preferably between 70 and 85% in weight, of the slip A. Preferably, the mixture M contains from 50 to 80%, preferably from 60 to 70%, in weight of ceramic particles.

The nature of the ceramic powder is adapted according to the ceramic foam to be manufactured.

In the case of the manufacture of recrystallized silicon carbide foam, the powder is a silicon carbide powder, of which the granulometric distribution is preferably bimodal or trimodal. The first mode is preferably less than 5 μm, preferably still less than 3 μm, preferably always less than 1 μm, and the second mode is preferably greater than 10 µm, preferably greater than 20 µm. The third mode is an intermediate mode between the first and second modes. The size of the grains is preferably between 0.5 and 10 microns, with an average size equal to 2.5 µm. Such a granulometric distribution advantageously makes it possible to obtain a ceramic foam having a particularly developed intergranular porosity.

For the foams represented on FIGS. 1 to 4 and 7 to 9, the ceramic powder used at step a) is a powder comprising more than 95% in weight of silicon carbide.

The dispersant, optional, is for example a surfactant of soda type. Advantageously, the dispersant makes it possible to adjust the pH so as to allow an effective dispersion of silicon carbide.

The gelling agent is preferably a hydrocolloid of animal or vegetable origin, adapted to gel said composition after foaming in a thermo-reversible way, for example gelatine, carrageenan, or a mixture thereof.

The stabilizing agent can be as desired. Preferably, it has the property to have a viscosity which increases by at least a factor ten when the speed gradient of its shearing decreases from $100 \text{ s}^{-1}$ to $0 \text{ s}^{-1}$. Preferably, the stabilizing agent is selected so that the viscosity of the mixture M during shearing is not increased very much, because of its incorporation in this mixture.

Advantageously, it is thus possible to use the mixers employed according to the prior art without needing to increase the water content of the mixture. The increase in the water content would indeed cause problems during later drying.

Preferably, the stabilizing agent is selected to be reversible. Preferably still, the stabilizing agent and the gelling agent are selected so that the viscosity of the gelled foam is greater than or equal to that of a gelled foam obtained from a mixture identical to the mixture M, but which would not contain a stabilizing agent, and the viscosity of the foam obtained between steps b) and c) (before gelling and after the end of the foaming operation) is greater than or equal to that of a gelled foam obtained from a mixture identical to the mixture M, but which would not contain a gelling agent.

Preferably, the stabilizing agent and the gelling agent are selected so that they do not substantially interact one with another. The associations of gelatine on the one hand and xanthan and/or carrageenan, preferably of xanthan alone, are most preferred.

Xanthan and carrageenan are physical gels, i.e. having a structure reversible in a network, wherein the bonds are formed by physical interaction (crystallization, helix formation, vitrification . . . ). For example, the xanthan molecule can be in the form of a single, double or triple helix which interacts with other molecules to form a complex network. In solution in water, aggregates with weak bonds are formed. These aggregates can be dissociated by a shearing action.

Preferably, at least one plasticizing agent, preferably being in liquid form at the preparation temperature of the mixture M, preferably a polyol, preferably still glycerol, is added to the premixture B. The plasticizer agent is selected to have a good compatibility with the gelling agent, i.e. a capacity to remain inside the mixture M and to thus resist migration and solvents, without causing separation of phases at the same time. Preferably, the content of plasticizing agent is between 0.25 and 1 times that of the gelling agent.

The foaming agent, preferably a soap, is preferably added in the premixture C in a proportion between 55 and 75% in weight of said premixture. Preferably still, the quantity of foaming agent is determined so that its content in the mixture M is between 1 and 5% in weight.

The mixture M can further contain one or more temporary thermoplastic binders, usually used in ceramic.

The slip A and the premixture C are then added to the premixture B under mechanical agitation, the temperature, called "mixing temperature", being maintained higher than the gelling temperature of the gelling agent. Preferably, the premixtures A, B and C are mixed immediately after their preparation to form the mixture M. The stabilizing agent leads to aqueous solutions having a stable viscosity in the range of temperature used.

The pH of the premixture B can be acid, alkaline or neutral and is preferably selected so as to allow a good dispersion with the premixture A.

At step b), the mixture M is sheared so as to foam. Shearing can result from mechanical agitation, gas blowing, or by any combination of these two techniques. In the case of the gas blowing, the use of a membrane provided with calibrated holes is preferred.

During this step b), if the viscosity of the stabilizing agent is reversible under the effect of shearing, shearing reduces the viscosity of the mixture.

Step b) is carried out at a temperature higher than the gelling temperature of the gelling agent, for example at the mixing temperature.

After obtaining the ceramic foam, the shearing is stopped, then, possibly, the foam is casted into a mould.

The presence of the stabilizer immediately increases the viscosity of the mixture due to the end of shearing. The stabilizing agent thus makes the structure of the foam rigid, even though the temperature remains higher than the gelling temperature. Any collapse of the foam on itself before the gelling step is thus avoided, and it becomes possible to manufacture stable foams with a thickness of more than 60 mm, and even of more than 80 mm.

At step c) the foam is cooled or left to cool to a temperature lower than the gelling temperature of the gelling agent, preferably to ambient temperature (10-25° C.). Gelling advantageously makes it possible to obtain a sufficiently rigid gelled foam to be handled without damage. The method thus lends itself well to an industrial implementation.

The gelled foam is then dried at ambient temperature, then preferably stoved at a temperature of 100 to 120° C. such as to obtain a preform which can be cured. The preform, or "raw", can advantageously have a thickness up to 80 mm, and even 150 mm.

The preform can be then calcinated under argon, at a temperature allowing recrystallized silicon carbide to be obtained, namely 1,800-2,500° C.

Other conditions of curing by high temperature treatment are conceivable, provided that they lead to a recrystallization of silicon carbide. These conditions are well-known by one skilled in the art.

After stoving and before or after curing by high temperature treatment, the foam can be manufactured with the desired dimensions.

The porous ceramic obtained by curing by high temperature treatment of the preform is a foam with an open and interconnected structure. Advantageously, it has a density after curing between 8 and 50% of the theoretical density of the material (equal to 3.2 grams per cubic centimetre for the recrystallized silicon carbide), then a porosity between 50 and 92%.

The size of the cellular pores generally varies between 10 and 2,000 µm.

The foam has a plurality of cells 10 (see FIGS. 1 to 4 and 7 to 9) connected to other adjacent cells by windows 12. A cell on the surface of the porous ceramic foam further has one or more openings 16 towards the outside. "Interconnection porosity" means the porosity created by the interconnection windows 12 between the cells and by the openings 16 of the surface cells (i.e. delimiting the external sides of the block of foam).

The recrystallized silicon carbide ceramic walls delimiting the cells 10 are porous. They are indeed formed by agglomeration of grains 18, this agglomeration letting interstices 20, or "intergranular pores" remain between the grains 18.

The grains 18 are formed by the largest particles of the silicon carbide powder used at step a). The granulometric distribution of grains 18 is thus substantially the same as that of these large particles.

The walls 17 thus have a porosity known as "intergranular". The intergranular porosity is thus made from interstitial spaces which necessarily create between the grains, the agglomeration of these grains.

As described above, the interconnection porosity is created by the "cellular pores", namely the interconnection windows 12 between the cells 10 and the openings 16 towards the outside of the surface cells.

The interconnection porosity is thus formed by openings whose contours are not the necessary consequence of an agglomeration of grains, but result from a particular arrangement of these grains. Contrary to the intergranular porosity, it allows a direct connection (i.e. "in a straight line") between the adjacent cells.

The intergranular porosity thus coexists with the "interconnection porosity" between the cells of the foam, the total porosity being the sum of the interconnection porosity and the intergranular porosity.

The average size of the cellular pores is around 350 μm whereas the average size of the intergranular pores is around 10 to 15 μm. The total porosity of the example 21 is 86% (0.43 g/cm$^3$ density) and the intergranular porosity is approximately 10%.

Preferably, the size of the intergranular pores is on average 10 to 100 times smaller than that of the cellular pores. It is also preferred that the average size of the cellular pores is between 150 and 700 μm, preferably around 350 μm, and/or that the average size of the intergranular pores is between 10 and 15 μm.

The intergranular porosity can be modified according to the size of the grains of the ceramic powder used, particularly of silicon carbide.

The interconnection porosity can be modified according to the foaming agent implemented, particularly according to its quantity in the initial mixture.

According to the invention, at least a part of the intergranular pores are filled with an impregnation material 22. Preferably, the impregnation material is selected from metals, particularly silicon and aluminium, metal alloys, molten glasses and thermoplastic organic compounds.

Any method allowing this "filling of the intergranular pores", or "impregnation of the cellular walls", is conceivable. According to the invention, it is preferable to use one of the following ways:

According to way 1, one impregnates, at least partly, the cellular walls after step e) of curing, during which the recrystallization of silicon carbide occurs.

The impregnation material, initially in the form of powder, is placed above and below the ceramic foam, in contact with it. The foam and the impregnation material are then heated at an impregnation temperature at which the impregnation material is in liquid form and can penetrate in the intergranular pores by capillarity.

Preferably, the properties of the impregnation material and of the porous ceramic to impregnate are adjusted according to the desired penetration. These properties to be adjusted, obvious for one skilled in the art, particularly include the size of the intergranular pores, the viscosity of the impregnation material and the wettability coefficient of the ceramic foam. This adjustment can be done according to the conventional techniques, known by one skilled in the art. Given that the size of the intergranular pores is on average 10 to 100 times smaller than that of the cellular pores, only the intergranular pores will be filled by capillarity with the majority of the impregnation materials.

The smallest cellular pores can also be filled by action of gravity.

For a silicon impregnation, the impregnation temperature is preferably between 1,800 and 2,000° C.

Way 1 can be used to impregnate foams with any impregnation material, provided that its wettability and that the viscosity of the impregnation material are sufficient at the treatment temperature.

Although way 1 is known to impregnate porous ceramic foams, it is particularly well adapted for the impregnation of porous ceramic foams which, as according to the invention, have an intergranular porosity of at least 5%.

However, it has the disadvantage of requiring an extra step of manufacture which, moreover, can imply a high energy consumption. The inventors discovered a new method according to which the impregnation is carried out at the same time as the recrystallization treatment (at 2,200-2,300° C.).

According to a first alternative of this method (way 2a), impregnation material in powder form, preferably silicon metal, is placed in contact with the preform before proceeding to curing. Preferably, this impregnation material is placed on the upper and lower parts of the preform.

The assembly then undergoes the recrystallization curing. During this step, the impregnation material melts and penetrates, by capillarity, within the cellular walls, through the intergranular pores. At the same time, the silicon carbide recrystallizes.

According to a second alternative of this method (way 2b), impregnation material in powder form is introduced, preferably silicon metal, in the foaming slip, i.e. in the mixture M. The size of the silicon grains is preferably between 0.2 and 2 mm.

Preferably, carbon is also added to the foaming slip, preferably between 0.5 and 10% in weight, preferably approximately 1.5%. Carbon is preferably in the form of black carbon (elementary grain <1 micron) or graphite (5 to 15 microns).

The presence of carbon makes it possible to create secondary silicon carbide. That improves the final mechanical properties but also the mechanical properties during curing, because the secondary silicon carbide is produced at a low temperature (1,400-1,500° C.).

During the later step of curing, the silicon carbide is recrystallized while the impregnation material melts and infiltrates within the intergranular pores.

When the impregnation material is metal silicon, a portion of the latter is consumed by the carbon to make the secondary silicon carbide. The quantity of metal silicon is thus determined so that despite this consumption, a sufficient amount remains to infiltrate the pores.

Of course, ways 1, 2a and 2b can be combined.

Whatever the way, preferably, the quantity of impregnation material in powder form is determined to represent a volume greater than or equal to at least 1.05, preferably 1.1, times and, preferably, less than 1.2 times the volume of the intergranular pores. In other words, an excess of impregnation material in relation to the quantity strictly necessary is used to fill the volume of the intergranular pores.

However, the inventors noted that the excess impregnation material, particularly silicon, even in large quantity, does not remain in the part. The quantity of impregnation material in powder form is limited to less than 1.2 times the volume of the intergranular pores for economic reasons.

The presence of an adjustable double porosity, particularly for ceramic foams containing recrystallized silicon carbide, is particularly advantageous.

The presence of the intergranular porosity indeed gives, at the same time, a large available surface for binding the impregnation material, and a possibility of inserting this impregnation material within the cellular walls, which, advantageously, avoids a considerable reduction in the volume of the cells. The loss of charge brought about by the crossing of a part according to the invention is thus advantageously limited.

The ceramic parts according to the invention are thus effective for filtration, while having a high mechanical strength.

The controlled quantity (from 5 to 15%, preferably approximately 10% in volume of the ceramic part obtained) of the impregnation material makes it possible moreover, to preserve a low density and thus a weak thermal inertia. The ceramic parts according to the invention thus resist very well against the high temperatures, and are therefore well adapted to be used as curing supports. The ceramic parts according to the invention implementing recrystallized silicon carbide foams are particularly useful in this application because they can resist very high temperatures. Owing to the fact that they conduct the heat effectively, resist to the high temperatures and let the air or gases pass, the ceramic parts according to the invention implementing recrystallized silicon carbide foams are also perfectly adapted to form flame spreaders in infra-red burners.

Preferably, the quantity of impregnation material is controlled in such a way that only the desired porosity is filled. The ceramic part according to the invention can thus have a total porosity greater than the known ceramic foams, and therefore a large available surface. The parts according to the invention are therefore also very useful as catalyst supports.

Figure 5:
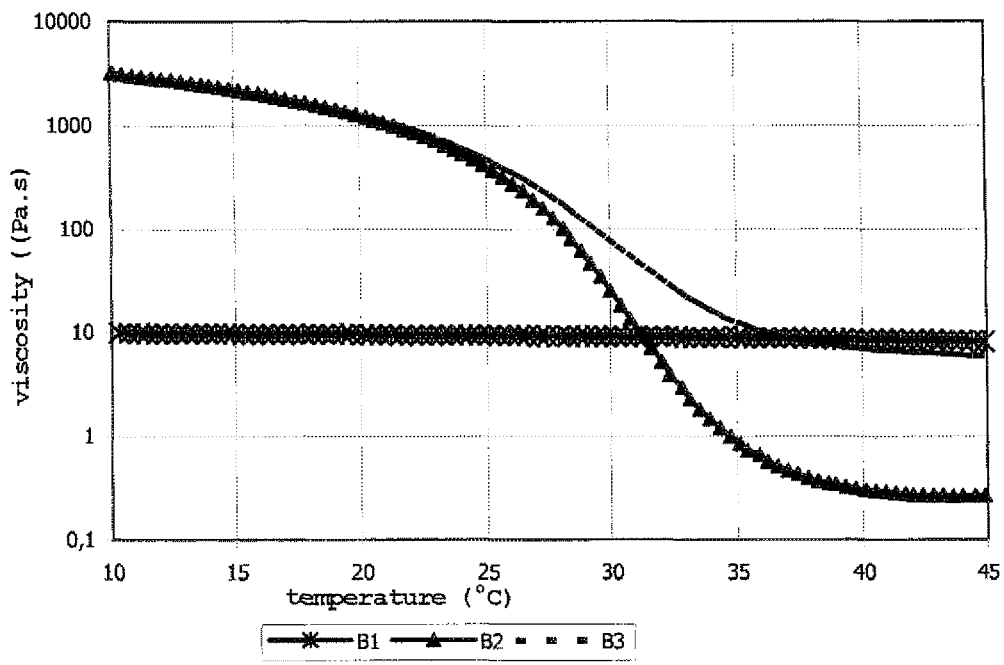
FIGS. 5 and 6 are graphs highlighting the rheological behaviour of various premixtures B described below.
Figure 6:
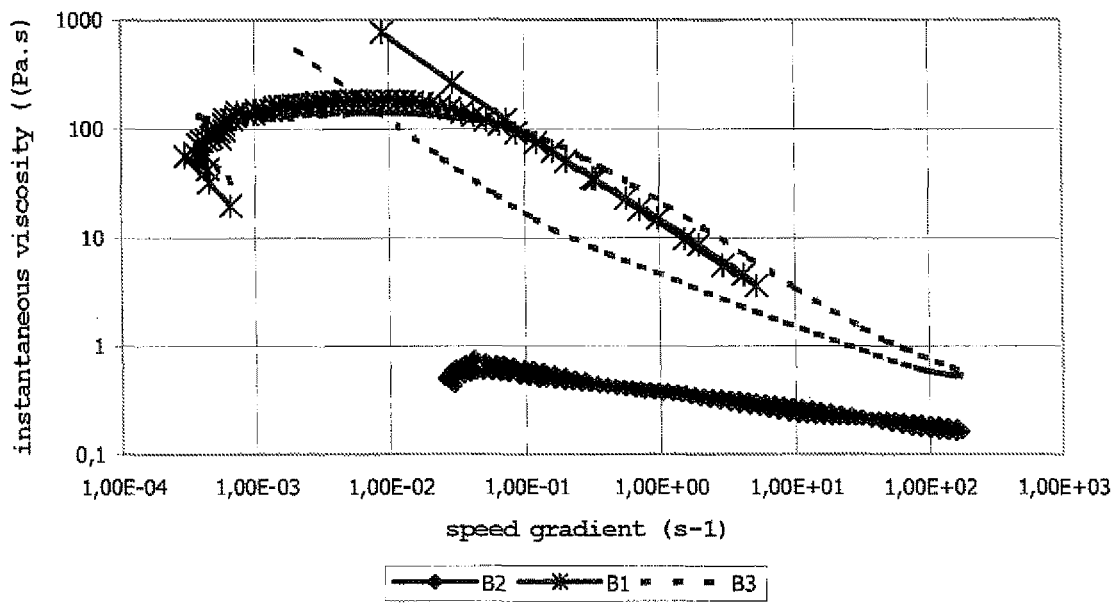
Figure 7:
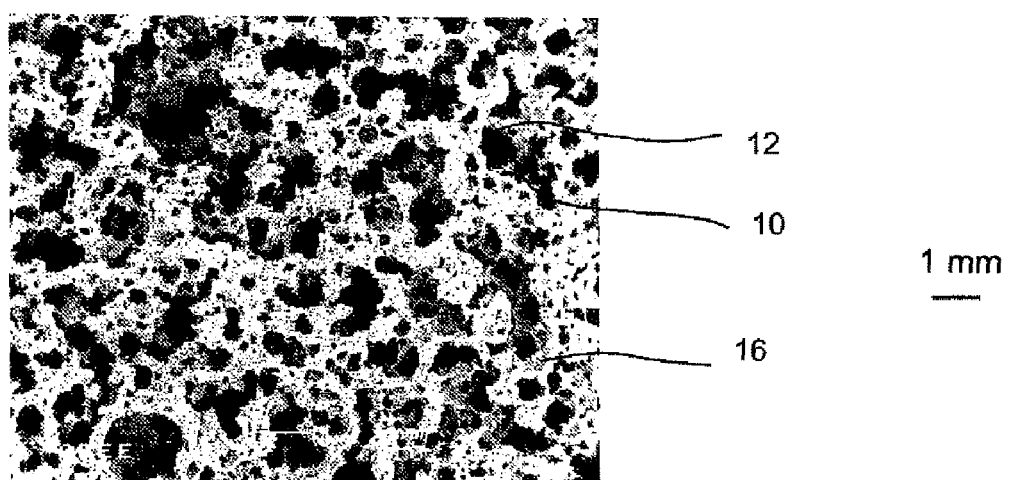
FIGS. 7 to 9 show, with various enlargements, the images obtained with a Scanning Electron Microscope, on samples taken at 10 to 20 mm from the surface of cured foams described in FR 0507936 and corresponding to example 21 described below.
Figure 8:
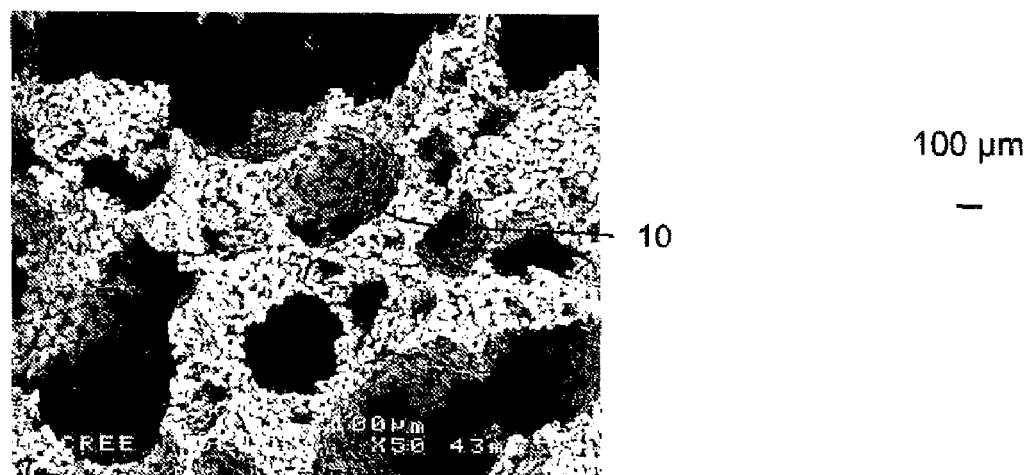
Figure 9:
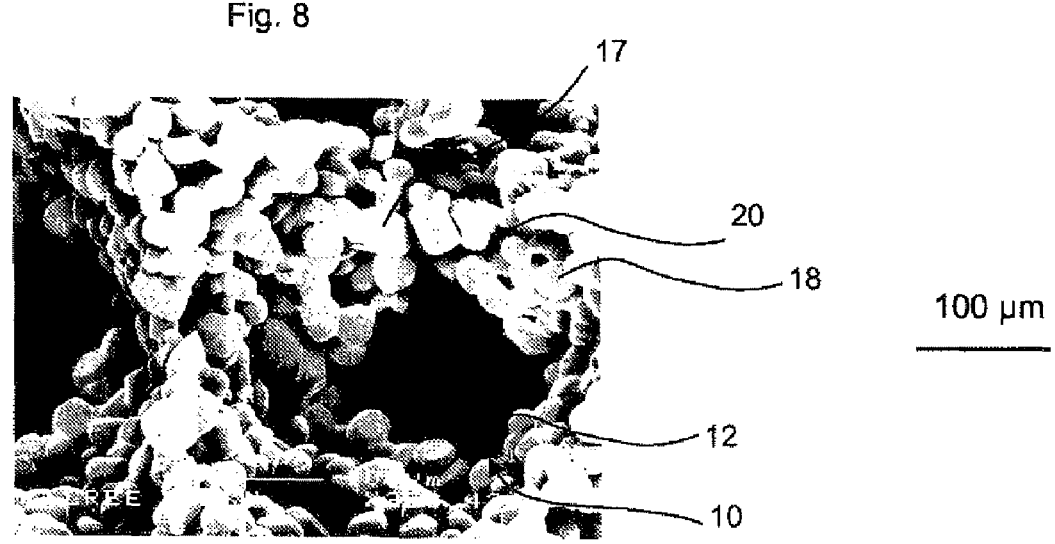

One now refers to FIGS. 5 and 6.

FIG. 5 represents the evolution of the viscosity of three premixtures B1, B2 and B3, supplied as examples, which can be used to manufacture the mixture M.

B1 contains 87% of water, 7.4% of glycerol, 4.8% of polyvinyl alcohol and 0.8% of xanthan.

B2 contains 77.3% of water, 6.5% of glycerol, 4.2% of polyvinyl alcohol and 12% of gelatine.

B3 contains 76.7% of water, 6.5% of glycerol, 4.2% of polyvinyl alcohol, 11.9% of gelatine and 0.7% of xanthan.

These premixtures are prepared at 80° C., then maintained for 3 hours at 40° C. The viscosity of these mixtures is then measured, maintained in rest position, according to their temperature, lowering the temperature by 1° C. per minute, from 45° C. (close to the development temperature of the mixture M) to 10° C. The measurement is taken with a Bohlin® CVO 120 viscometer in plane cone (diameter 40 mm, angle 4°), oscillating at 1 hertz with a distortion of 0.01. The results of the test A are presented on FIG. 5.

FIG. 5 shows that the xanthan alone (curve B1) does not make it possible to vary the viscosity of the mixture according to the temperature. Therefore, the xanthan is not a thermo-reversible gel, unlike the gelatine (curve B2). The xanthan thus does not appear suitable to make the viscosity of a ceramic mixture vary according to the temperature. Therefore, particularly, it appears not very suitable to gel a ceramic foam during cooling.

FIG. 5 also shows that the xanthan, when alone, does not allow a high viscosity to be reached, which may freeze a ceramic foam. On the contrary, the gelatine makes it possible to reach, at ambient temperature (10-25° C.), satisfactory viscosities, between 200 and 500 times greater than those reached with the xanthan alone.

Finally, FIG. 5 shows that the presence of xanthan does not hinder the gelling action of the gelatine, the effect of the xanthan being negligible at temperatures lower than 25° C. The association of xanthan and gelatine apparently has substantially no technical effect at temperatures lower than 25° C.

On FIG. 6, instantaneous viscosities of B1, B2 and B3 at 45° C. were represented according to this speed gradient (or "shearing speed"). To obtain the results represented on FIG. 6, one makes the speed gradient evolve, increasingly, then one waits 1 minute, then one makes the speed gradient evolve, decreasingly. Throughout the test, led to a temperature of 45° C. (close to the development temperature of the mixture M), the evolution of viscosity is measured. The measurements are taken with a Bohlin® CVO 120 viscometer in plane cone (diameter 40 mm, angle 4°), in rotation.

It is observed that in the absence of xanthan, the viscosity of the gelatine does not evolve, or very little according to the speed gradient. On the other hand, the instantaneous viscosity of the mixture of gelatine and xanthan, like that of the xanthan alone, very strongly decreases when the shearing increases, and regains very strong values when the shearing decreases, and this same with low contents of xanthan.

It was also noted that an increase or a reduction in the viscosity of a product (gelatine, xanthan or a mixture thereof), following a change of the temperature or shearing speed, leads to, under the same temperature and shearing conditions, an improvement or a deterioration, respectively, in the structural performance of the foam obtained by shearing of a refractory composition incorporating this product.

At the end of the shearing step b), the mixture of gelatine and xanthan incorporated in the mixture M thus leads, according to the teachings of FIG. 6, to an immediate improvement of the structural performance of the foam, in proportions much greater than that which gelatine alone could provide. The foam is therefore sufficiently rigid so that it does not break down. It is easier to handle. Finally, the action of mixing xanthan and gelatine avoids a modification of the structure (coalescence of the air bubbles, segregation of the ceramic powder . . . ) who could lead to a heterogeneity of the product and an embrittlement.

The temperature of the foam thus falls gradually, which allows, according to the teaching of FIG. 5, to further increase the structural performance of the foam in proportions much greater than that which the xanthan alone could provide. The foam is therefore sufficiently rigid to be able to be handled under industrial conditions without damage.

The actions of the gelatine and the xanthan thus perfectly complement each other for the implementation of the method according to the invention, particularly for the manufacture of large foams.

The following non-restrictive examples are given to illustrate the invention.

In the examples which follow, the raw materials employed were selected from:

gelatine GPA A0, marketed by Wesardt International;

Satiaxane™ CX90T, xanthan gum produced and marketed by SKW Biosystems;
RHODOVIOL® 4/125, polyvinyl alcohol with a weak rate of hydrolysis (88 mol %), marketed by Rhodia PPMC;
glycerol, marketed by Moulet Peinture (Avignon—France);
Schäumungsmittel W53FL, dispersant containing ammonium polyacrylate, marketed by Zschinmer & Schwarz GmbH.;
SiC-1 silicon carbide whose median diameter is around 0.6 μm and containing more than 99.5% of SiC;
SiC-2 silicon carbide whose median diameter is around 2.5 μm and containing more than 99.5% of SiC;
SiC-3 silicon carbide whose median diameter is around 23 μm and containing more than 99.5% silicon carbide.

In all the following examples, the dispersant is always soda, the foaming agent is always W53FL, the plasticizer is glycerine and the hardener is RHODOVIOL® 4/125.

The slip A is produced by dispersion of the ceramic powder and the dispersant in water. The ceramic powder is a mixture of two silicon carbide powders according to the following mass proportions:

| Example | 21 | 22 | 23 |
|---|---|---|---|
| SiC-1 (%) | 33 | | |
| SiC-2 (%) | | 66 | 67 |
| SiC-3 (%) | 67 | 34 | 33 |

0.45% of soda 1N played the part of the dispersant; the slip thus had a pH of around 9.

The premixture B is produced, in a water bath at 55° C., by dissolution of gelatine GPA A0 and possibly of xanthan, glycerol and hardener in water.

The premixture C is produced by solubilisation of two thirds (in weight) of solubilised foaming agent in a third of water.

A and C are added to B in a water bath at 55° C. under constant mechanical agitation for 20 minutes. The proportions of components A, B and C in the final mixture M, except ceramic powder, are given in table 1. The foam obtained is casted in a mould at ambient temperature, lower than 25° C. The mould has dimensions of 300 mm×300 mm×45 mm. It is dried for 24 hours at ambient temperature, then 24 hours at 35° C. under forced ventilation to obtain the preform.

This preform is then cured under argon for 3 hours at 2,270° C. to obtain recrystallized silicon carbide.

One can notice that, during curing by high temperature treatment, the dimensional withdrawal is substantially null and the same in all directions.

Certain characteristics of the ceramic foams thus obtained were shown in tables 1 and 2.

After the casting, one can sometimes note an immediate freezing as soon as the agitation and/or handling (casting in a mould) stops. "Freezing" means that the height of the casted part does not decrease and/or vary according to the zones of the casted part. In the table, "Y" means that the freezing was observed and "N" means that the structure of casted foam evolved after casting (absence of freezing).

The presence of cracks is indicated by "Y" in table 1, "N" meaning that there are no cracks observed.

The density is measured according to a traditional geometrical method and expressed in grams per cubic centimetres.

The addition of a stabilizing agent makes it possible to freeze the structure obtained by mechanical foaming. Homogeneous parts are therefore obtained, and with desired dimensions.

The plasticizing agent makes it possible to obtain more flexible parts, and for which drying does not induce the formation of cracks. In addition, preferably, as is the case here, the used plasticizing agent burns at a temperature much higher than evaporation temperature of water. Therefore, this compound will play its part even on the dried part and, during curing, will make it possible to keep a certain moisture in the part, and will thus avoid too fast drying and a "crust" effect on the end product. This favourable effect is particularly useful for the manufacture of large parts.

As described above, the ceramic foams manufactured according to the method described above have a structure formed of imbricated cells, delimited by ceramic walls and connected together by windows. The size of the cellular pores is distributed in a relatively homogeneous way between 10 and 2000 μm; less than 10% of the cellular pores have a diameter less than 10 μm, 20 to 85% of the cellular pores have a diameter less than 300 μm and 4 to 40% of the cellular pores have a diameter greater than 450 μm.

The foams are also distinguished from the foams known to date by a very wide range of sizes of cellular pores, the absence of a dominant size of cellular pores and a lower number of cellular pores per unit of surface. Indeed, in general, one can count less than 1,500 cellular pores per $dm^2$.

In addition, it is observed that, when the density decreases, the porosity is increased by an increase in the size of the cellular pores whereas their number falls. More than 15% of the cellular pores, and sometimes even at least 30% of the cellular pores, have a diameter greater than 300 μm.

On the contrary, the ceramic foams known to date have a pore size which varies little according to the density, and generally less than 300 μm for 90% of the pores; the reduction in density is thus accompanied by an increase in the number of pores.

The presence of large cellular pores of the foams of table 1 also makes it possible to obtain products having a very weak loss in charge, which is particularly advantageous in certain applications, for example for gas filtration.

TABLE 1

| Example | dispersant | gelatine | xanthan | Foaming agent | water | glycerol | hardener | Density g/cm³ | Freezing after casting | Cracks after drying | Mechanical strength mPa |
|---|---|---|---|---|---|---|---|---|---|---|---|
| | | | % in weight in the mixture M (1) | | | | | | | | |
| 21 | 0 | 1.7 | 0.1 | 2.1 | 27.2 | 1.0 | 0.6 | 0.43 | Y | N | 0.4 |
| 22 | 0 | 1.8 | 0.1 | 2.3 | 27.2 | 1.0 | 0.7 | 0.40 | Y | N | 0.5 |
| 23 | 0 | 1.9 | 0.1 | 2.2 | 27.3 | 1.0 | 0.7 | 0.81 | Y | N | 1.7 |

(1) The complement is made up of the ceramic powder

These foams are also remarkable in that they have a very high chemical purity. This purity is related to the purity of the ceramic raw materials used, since all the organic components used are burnt during curing by high temperature treatment.

The following table 2 summarises the test results done on the foams of examples 21 and 23 above and on a part according to the invention, obtained by impregnation of a ceramic foam according to example 21 above.

The density was measured as described previously. The porosity was obtained by calculation, by comparing the density of the material with the theoretical density of the silicon carbide.

The Module of Rupture MOR was measured by three-point flexural on samples of size 140×30×13 mm.

TABLE 2

|  | Foam of example 21 | Foam of example 23 | Foam of example 21, impregnated |
|---|---|---|---|
| Density (g/cm$^3$) | 0.44 | 0.8 | 0.70 |
| Porosity (%) | 86% | 75% | 75% |
| MOR (MPa) | 0.4 | 1.7 | 3.8 |

Table 2 shows that the part according to the invention obtained by impregnation of a foam according to example 21 has a breaking resistance much greater than that of this foam. However, the porosity of the part according to the invention remains very high.

The porosity of the part according to the invention is similar to that of the foam of example 23, but the part according to the invention is advantageously less dense and more resistant to breaking.

As it appears clearly now, the invention provides a porous ceramic part which has both a great porosity and an improved mechanical strength.

Of course, the present invention is not limited to the described and represented embodiments, provided as illustrative and non-restrictive examples.

Particularly, the ceramic foam with intergranular porosity implemented is characterized by a particular microstructure, particularly a total porosity between 50 and 92% and an intergranular porosity of at least 5%. With the knowledge of the inventors, a cured ceramic foam with this microstructure, notably a cured foam made out of recrystallized silicon carbide, is not known from the prior art. Any cured ceramic foam with this microstructure, independently from the method implemented to manufacture it, could be used to manufacture the part according to the invention.

In the preferred embodiment of the invention, this microstructure results from a recrystallization of silicon carbide during the curing step by high temperature treatment. Other ceramic materials are however also conceivable.

The invention claimed is:

1. A porous ceramic part comprising a porous ceramic foam having cells and presenting a total porosity of between 50 and 92%, the total porosity being the sum of an interconnection porosity, defined by "cellular pores", and of an intergranular porosity, defined by "intergranular pores", walls of at least some of the cells of the ceramic foam defining said intergranular porosity being at least partly impregnated with an impregnation material, said ceramic foam having an intergranular porosity of at least 5% before said impregnation.

2. The porous ceramic part according to claim 1, wherein the impregnation material is selected from a metal, a metal alloy, a molten glass and a thermoplastic organic compound.

3. The porous ceramic part according to claim 1, wherein the impregnation material is selected from silicon, aluminum, a soda-lime glass, a boron glass, and a thermoplastic resin.

4. The porous ceramic part according to claim 1, wherein at least a part of the cells is delimited by recrystallized silicon carbide walls, at least partly.

5. The porous ceramic part according to claim 1, wherein the porous ceramic foam comprises at least 95% in mass of recrystallized silicon carbide.

6. The porous ceramic part according to claim 1, having a flexural Modulus of Rupture greater than 2 MPa, and a total porosity greater than 70%.

7. The porous ceramic part according to claim 1, wherein the average size of the cellular pores of the foam is between 150 and 700 μm.

8. The porous ceramic part according to claim 1, wherein the volume of the impregnation material is substantially equal to the volume of the intergranular pores of the foam before impregnation.

9. The porous ceramic part according to claim 1, wherein the porous ceramic foam has a thickness greater than 60 mm.

10. The porous ceramic part according to claim 1, wherein the quantity of impregnation material is between 5 and 15% in volume of the ceramic part.

11. A method for manufacturing a porous ceramic part comprising an impregnation, by means of an impregnation material, of at least a part of the walls of cells of a ceramic foam having a total porosity of between 50 and 92%, the total porosity being the sum of an interconnection porosity, defined by "cellular pores", and of an intergranular porosity, defined by "intergranular pores", the walls of at least some of the cells of the ceramic foam defining said intergranular porosity, said ceramic foam having an intergranular porosity of at least 5%.

12. The method according to claim 11, wherein the impregnation material and the ceramic foam are selected so that said porous ceramic part comprises a porous ceramic foam having a total porosity of between 50 and 92% and an intergranular porosity of at least 5%, walls of at least some of the cells of the ceramic foam being at least partly impregnated with an impregnation material.

13. The method for manufacturing a porous ceramic part according to claim 11, wherein said ceramic foam is manufactured according to the following successive steps:
a) preparation of a mixture M containing a suspended ceramic powder, at least one gelling agent and at least one foaming agent, at a mixing temperature higher than the gelling temperature of said gelling agent,
b) shearing of said mixture M at a foaming temperature higher than said gelling temperature, until a foam is obtained,
c) gelling of said foam by cooling said mixture M at a temperature lower than the gelling temperature of said gelling agent,
d) drying of said gelled foam such as to obtain a preform,
e) curing of said preform such as to obtain a porous ceramic foam,
the mixture M comprising silicon carbide, and the curing at step e) being carried out under conditions allowing a consolidation by means of an evaporation-recrystallization mechanism of said silicon carbide.

14. The method according to claim 13, wherein an impregnation is carried out after step e).

15. The method according to claim 13, wherein, before step e), an impregnation material in the form of powder is put into contact with said preform.

16. The method according to claim 13, wherein, at step a), an impregnation material in the form of powder is added to the mixture M.

17. The method according to claim 16, wherein the impregnation material is a powder whose grade is between 0.05 and 2 mm.

18. The method according to claim 17, wherein at least 2% of silica is added to the mixture M, in mass percentage in relation to the mixture M.

19. The method according to claim 13, wherein the particle sizes of the ceramic powder implemented in step a) are distributed bimodally or trimodally.

20. The method according to claim 19, wherein the porous ceramic foam is manufactured from a silicon carbide powder with tri-modal granulometric distribution, the first mode being less than 5 microns, the second mode being greater than 10 microns and the third mode being an intermediate mode between the first and second modes.

21. The method according to claim 13, wherein a stabilizing agent is added to said mixture M, whose instantaneous viscosity, in Pa·s, increases by at least a factor ten when a shearing speed of said stabilizing agent falls from 100 $s^{-1}$ to 0 $s^{-1}$.

22. The method according to claim 21, wherein the stabilizing agent is selected so that the evolution of its viscosity according to the shearing speed is substantially reversible.

23. The method according to claim 21, wherein the stabilizing agent is selected so that, at the end of step c), the viscosity of said foam is greater than 1000 Pa·s at 20° C.

24. The method according to claim 13, wherein the recrystallization is carried out at a temperature between 1,800 and 2,500° C.

25. The method of manufacture according to claim 11, wherein the impregnation material is silicon metal.

26. The method according to claim 11, wherein an excess of impregnation material in relation to the quantity strictly necessary is used to fill the volume of the intergranular pores.

27. The method according to claim 11, wherein the quantity of impregnation material is less than 1.2 times the volume of the intergranular pores.

* * * * *